US008782565B2

(12) United States Patent
Fretwell et al.

(10) Patent No.: US 8,782,565 B2
(45) Date of Patent: Jul. 15, 2014

(54) SYSTEM FOR SELECTING OBJECTS ON DISPLAY

(75) Inventors: Lisa Fretwell, Leicester (GB); Clive Grinyer, London (GB)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 13/349,229

(22) Filed: Jan. 12, 2012

(65) Prior Publication Data
US 2013/0185679 A1    Jul. 18, 2013

(51) Int. Cl.
*G06F 3/048*    (2013.01)

(52) U.S. Cl.
USPC ............................ 715/862; 715/856; 715/859

(58) Field of Classification Search
CPC ............ G06F 3/04842; G06F 3/04812; G06F 3/0481; G06F 3/0482
USPC ................... 715/862, 856, 859; 345/633, 632
See application file for complete search history.

(56) References Cited

U.S. PATENT DOCUMENTS

| | | | |
|---|---|---|---|
| 6,313,745 B1 | 11/2001 | Suzuki | 340/572.1 |
| 6,404,426 B1 | 6/2002 | Weaver | 345/419 |
| 6,522,787 B1 | 2/2003 | Kumar et al. | 382/268 |
| 6,624,843 B2 | 9/2003 | Lennon | 348/61 |
| 7,058,204 B2 * | 6/2006 | Hildreth et al. | 382/103 |
| 7,149,665 B2 | 12/2006 | Feld et al. | 703/2 |
| 7,194,327 B2 | 3/2007 | Lam | 700/132 |
| 7,194,428 B2 | 3/2007 | Wan et al. | 705/26 |
| 7,212,202 B2 | 5/2007 | Weaver | 345/420 |
| 7,398,133 B2 | 7/2008 | Wannier et al. | 700/132 |
| 7,496,526 B2 | 2/2009 | Razumov | 705/26 |
| 7,522,165 B2 | 4/2009 | Weaver | 345/420 |
| 7,617,016 B2 | 11/2009 | Wannier et al. | 700/132 |
| 7,624,923 B2 | 12/2009 | Clark et al. | 235/383 |
| 7,627,142 B2 | 12/2009 | Kurzweil et al. | 382/114 |
| 7,712,035 B2 | 5/2010 | Giannini | 715/747 |
| 7,714,912 B2 | 5/2010 | Faisman et al. | 348/239 |
| 2002/0004763 A1 | 1/2002 | Lam | 705/26 |
| 2002/0188372 A1 | 12/2002 | Lane et al. | 700/130 |
| 2006/0059054 A1 | 3/2006 | Adiseshan | 705/26 |
| 2006/0218045 A1 | 9/2006 | Wagner | 705/26 |
| 2009/0115777 A1 * | 5/2009 | Reyers Moreno | 345/419 |
| 2010/0107229 A1 * | 4/2010 | Najafi et al. | 726/6 |
| 2011/0193939 A1 * | 8/2011 | Vassigh et al. | 348/46 |
| 2011/0289455 A1 * | 11/2011 | Reville et al. | 715/830 |
| 2011/0304541 A1 * | 12/2011 | Dalal | 345/158 |
| 2012/0040755 A1 * | 2/2012 | Pryor | 463/32 |

(Continued)

OTHER PUBLICATIONS

Mike Hodnick, "Creating a Kinect selection progress cursor in WPF," Jan. 14, 2011, blog.avtex.com, pp. 1-5.*

(Continued)

*Primary Examiner* — Kieu Vu
*Assistant Examiner* — Asteway T Gattew
(74) *Attorney, Agent, or Firm* — Brinks Gilson & Lione

(57) ABSTRACT

In one embodiment, a method of detecting a mouse click on a virtual mirror display can include displaying a selectable object on the virtual mirror display. The method can include displaying a cursor position by displaying a circle on the virtual mirror display. The cursor position can correspond to a hand position. The method can include detecting the mouse click in response to the circle hovering over at least part of the selectable object. The circle can remain steady over the selectable object on the virtual mirror display for a predetermined period of time.

20 Claims, 6 Drawing Sheets

(56) References Cited

U.S. PATENT DOCUMENTS

| | | | | |
|---|---|---|---|---|
| 2012/0086783 | A1* | 4/2012 | Sareen | 348/47 |
| 2012/0157203 | A1* | 6/2012 | Latta et al. | 463/32 |
| 2012/0157208 | A1* | 6/2012 | Reville et al. | 463/39 |
| 2012/0194561 | A1* | 8/2012 | Grossinger et al. | 345/661 |
| 2012/0200494 | A1* | 8/2012 | Perski et al. | 345/156 |
| 2012/0309532 | A1* | 12/2012 | Ambrus et al. | 463/36 |
| 2012/0313848 | A1* | 12/2012 | Galor et al. | 345/156 |
| 2012/0313969 | A1* | 12/2012 | Szymczyk et al. | 345/633 |
| 2013/0055150 | A1* | 2/2013 | Galor | 715/784 |
| 2013/0063374 | A1* | 3/2013 | Lee et al. | 345/173 |
| 2013/0063487 | A1* | 3/2013 | Spiegel et al. | 345/633 |
| 2013/0071816 | A1* | 3/2013 | Singh et al. | 434/81 |

OTHER PUBLICATIONS

Jennifer Bergen, "Virtual dressing room uses Kinect and augmented reality, makes shopping even easier," May 18, 2011, geek.com, pp. 1-2.*

"AITech :: Retail Intelligence," 2011, http://aitech.es/magicmirror/index.php, pp. 1-8.*

Introducing StyleMe™ http://www.youtube.com/watch?v=3X6mIDiBAMU&sns=em; Uploaded by aitechMagicMirror on Nov. 4, 2011; CISCO—CInstore—AITech; Length 5:56; This Video Should Be Viewed in Its Entirety.

Fitnect—Interactive Virtual Fitting/Dressing Room application; www.fitnect.com, interactive fitting room; http://www.youtube.com/watch?v=1jbvnk1T4vQ; Uploaded by 1982macleaod on Aug. 9, 2011; Length: 1:27; www.fitnect.com; This Video Should Be Viewed in Its Entirety.

Kinect Hack Let's You Play Dress Up—Virtual Dressing Room; http://www.youtube.com/watch?v=p70eDrvy-uM; Uploaded by EMGNetwork on Jul. 9, 2011; Length 2:15; www.YourEMGN.com; This Video Should Be Viewed in Its Entirety.

Online Fitting Room Shopping Augmented Reality; Imagine That online virtual fitting room; http://www.youtube.com/watch?v=QHAyOtLuqtY&feature=related; Uplaoded by ImagineThatTech on Apr. 29, 2011; Length 0:38; This Video Should Be Viewed in Its Entirety.

Virtual Dressing Room; Dressing Room virtuel avec Microsoft Kinect; http://www.youtube.com/watch?v=OriCElooe_o &feature=related; Uploaded by LabInnovation on Jul. 25, 2011; Length 1:16; This Video Should Be Viewed in Its Entirety.

Project Natal; http://www.youtube.com/watch?v=g_txF7iETX0; Uploaded by XboxE3 on Jun. 1, 2009; Length 3:40; This Video Should Be Viewed in Its Entirety.

Ultimate Battlefield 3 Simulator—Build & Test (Full Video)—The Gadget Show; http://www.youtube.com/watch?v=eg8Bh5iI2WY; Uploaded by thegadgetshow on Oct. 24, 2011; Length 17:36; This Video Should Be Viewed in Its Entirety.

Basic cursor control with Kinect hand tracking in WPF; Mike Hodnick, www.avtex.com; http://www.youtube.com/watch?v=bJjUpfvnMmM; Uploaded by kindohm on Jan. 20, 2011; Length 0:33; This Video Should Be Viewed in Its Entirety.

The Future of Shopping; http://www.youtube.com/watch?v=jDi0FNcaock; Uploaded by ciscovid on Oct. 2, 2009; Length 0:49; http://bit.ly/FMenv; This Video Should Be Viewed in Its Entirety.

The Virtual Fashion Mirror is the future of shopping; Cisco IBSG works with retailers to develop strategies that transform business models and customer experiences using network centric solutions; http://www.youtube.com/watch?v=Q9iq20G3KLA; Uploaded by Cisco on Jul. 11, 2011; Length 2:07; This Video Should Be Viewed in Its Entirety.

Welcome to Dontclick.It; http://www.lxfx.org/dcit/; Institute for Interactive Research; Oct. 2005; This Page Should Be Viewed in Its Entirety.

Newgrounds.com—Everything, by Everyone. Dress Up Yourself: WC Ed. by Kenney; Submitted Jul. 13, 2006 @ 04:01 PM EST; Game, 627.3 kb; http://www.newgrounds.com/portal/view/324739; This Page Should Be Viewed in Its Entirety.

Newgrounds.com—Everything, by Everyone. Dress up . . . Yourself 2! by Kenney; Submitted Jan. 31, 2004; 02:56 PM EST; Game; 46.9 kb; http://www.newgrounds.com/portal/view/148147; This Page Should Be Viewed in Its Entirety.

Newgrounds.com—Everything, by Everyone. Dress up . . . Yourself 3! by Kenney; Submitted Jun. 21, 2005; 02:53 PM EST; Game; 64.4 kb; http://www.newgrounds.com/portal/view/246155; This Page Should Be Viewed in Its Entirety.

Newgrounds.com—Everything, by Everyone. Dress up . . . Yourself! by Kenney; Submitted Jan. 11, 2004; 09:38 AM EST; Game; 418.1 kb; http://www.newgrounds.com/portal/view/144905; This Page Should Be Viewed in Its Entirety.

Newgrounds.com—Everything, by Everyone. Dress yourself *webcam* by Mechabloby; Submitted Jul. 24, 2006; 04:56 AM EST; Game; 1 MB; http://www.newgrounds.com/portal/view/327021; This Page Should Be Viewed in Its Entirety.

Newgrounds.com—Everything, by Everyone. Dress-Up: Yourself by Heedless; Submitted Sep. 1, 2003; 02:59 PM EST; Game; 17 kb; http://www.newgrounds.com/porta/view/120204; This Page Should Be Viewed in Its Entirety.

C In-Store::Retail Intelligence; Online Shopping; http://www.aitech.es/magicmirror/index.php; © 2011 C In-store Ltd., pp. 1-2; This Page Should Be Viewed in Its Entirety.

AITech::Magic Mirror; Magic Mirror coming out of the box . . . ; http://www.magic-mirror.es/; © 2008 Artificial Intelligence Technologies, S.L.; pp. 1-4; This Page Should Be Viewed in Its Entirety.

Four Ways that technology is changing clothes shopping; BBC—Newsbeat—Nov. 9, 2011; © BBC 2011; pp. 1-3; http://www.bbc.co.uk/newsbeat/15622940.

* cited by examiner

SYSTEM FOR SELECTING OBJECTS ON DISPLAY

FIELD

The present embodiments relate to a system for selecting an object on a display.

BACKGROUND

A graphical user interface (GUI) may enable a user to interact with an electronic device through a series of graphical icons or other visual indicators. The user may issue commands to the electronic device by manipulating the graphical elements of the GUI. Such manipulation generally may be accomplished with a pointing device such as a mouse, a trackball, a joystick, a pointing stick, a touchpad, or a touchscreen. The user may manipulate the pointing device to cause a corresponding movement of a pointer or a cursor on the GUI.

DETAILED DESCRIPTION OF THE DRAWINGS

Overview

Figure 1:
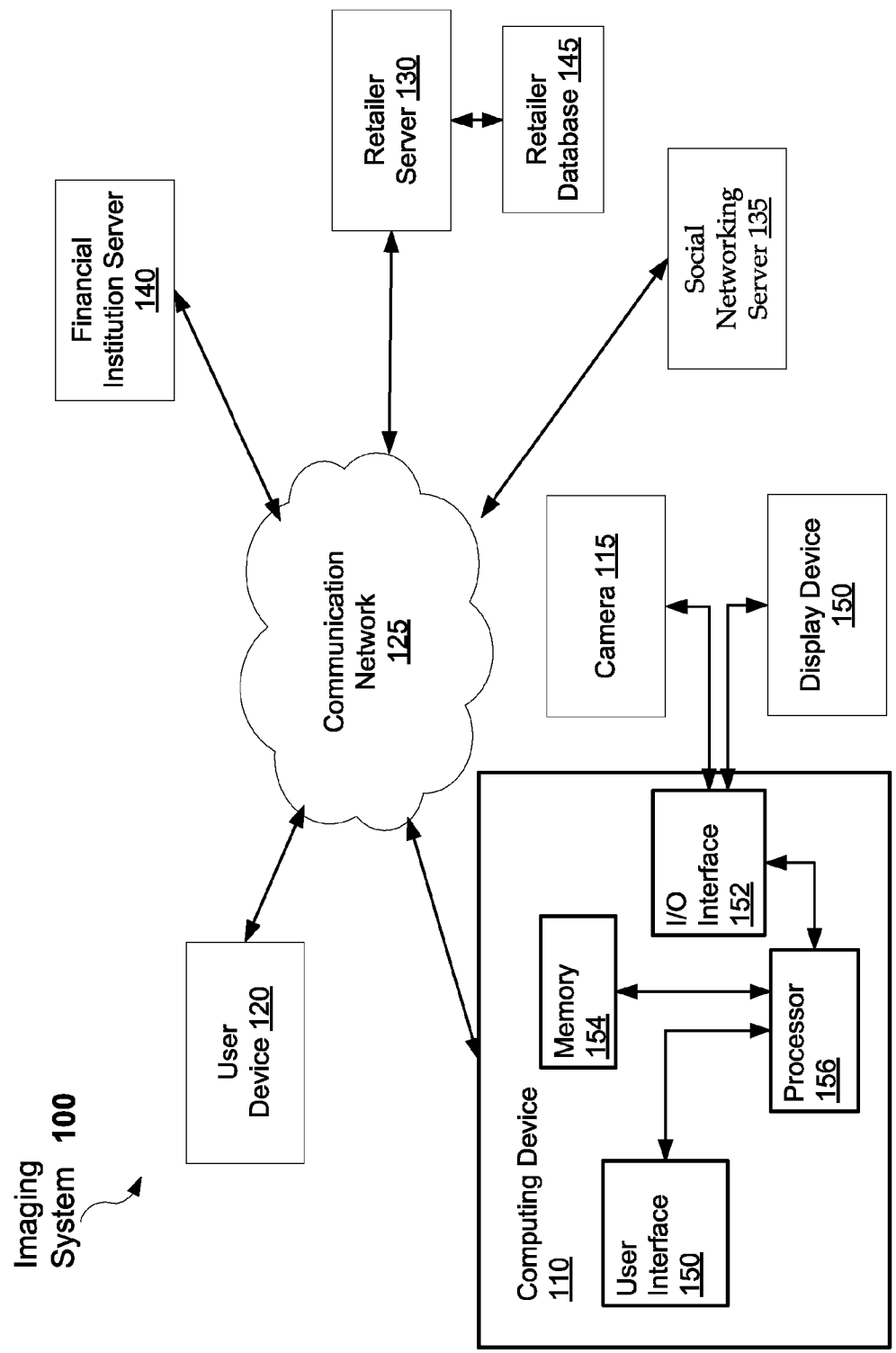
FIG. 1 illustrates one embodiment of an imaging system.

In one embodiment, a method of detecting a mouse click on a virtual mirror display can include displaying a selectable object on the virtual mirror display. The method can include displaying a cursor position by displaying a circle on the virtual mirror display. The cursor position can correspond to a hand position. The method can include detecting the mouse click in response to the circle hovering over the selectable object. The circle can remain steady over the selectable object on the virtual mirror display for a predetermined period of time.

In another embodiment, a system can include a memory including a plurality of modules and a processor configured to execute the plurality of modules. The system can include an image module configured to receive a moving image of a body from an image capture device. The system can include a hand detection module executable to determine a location of a left hand of the body in the received image and to determine a location of a right hand of the body in the received image. The hand detection module is executable to track movement of the locations of the left and right hands in the received image. The system can include a display module executable to display a left cursor and a right cursor on a display device. A position of the left cursor on the display device can correspond to the location of the left hand of the body. A position of the right cursor on the display device can correspond to the location of the right hand of the body. The system can include a boundary determination module executable to determine a position of a boundary on the display device. The boundary can extend at least partially horizontally. The boundary can include a boundary point corresponding to a point in the received image positioned between a chest of the body and a knee of the body. The display module is executable to display the left cursor on the display device in response to the location of the left hand relative to the boundary and to display the right cursor on the display device in response to the location of the right hand relative to the boundary.

In yet another embodiment, a computer readable medium can be encoded with computer executable instructions executable with a processor. The computer readable medium can include instructions executable to receive a moving image of a body. The computer readable medium can include instructions executable to determine locations of left and right hands of the body in the received image and to track movement of the locations of the left and right hands in the received image. The computer readable medium can include instructions executable to generate a selectable object. The computer readable medium can include instructions executable to display the selectable object and left and right cursors on a virtual mirror display. The position of the left cursor can correspond to the location of the left hand. The position of the right cursor can correspond to the location of the right hand. The computer readable medium can include instructions executable to recognize alignment of at least one of the position of the left cursor and the position of the right cursor with the selectable object. The computer readable medium can include instructions executable to display a circle surrounding the at least one of the left cursor and the right cursor in response to alignment with the selectable object. The computer readable medium can include instructions executable to detect a mouse click in response to the at least one of the left cursor and the right cursor remaining in alignment with the selectable object for a predetermined period of time.

EXAMPLE EMBODIMENTS

FIG. 1 is a schematic view of an imaging system 100 in accordance with some embodiments. In one example, the imaging system 100 may include a computing device 110, a camera 115, a user device 120, a retailer server 130, a retailer database 145, a financial institution server 140, and a social networking server 135. The various devices and servers described herein may be connected to a communication network 125 in any suitable manner including, for example, any wired or wireless connection using any network connection protocol.

The computing device 110 may be any type of computing device capable of establishing a networked connection and/or a peer-to-peer connection and capable of providing display, user interface, and/or input capabilities, as will be described in more detail below. The computing device 110 may be configured as, for example, a desktop computer, a personal computer (PC), a laptop computer, a palmtop computer, a handheld computer, a cellular telephone, a personal digital assistant (PDA), a computer workstation, a tablet PC, and the like.

The computing device 110 may include a user interface 150, a processor 156, a memory 154, and/or an input/output (I/O) interface 152. The user interface 150 may include buttons, sliders, knobs, a touch screen, or any other form of interface that allows user commands to be provided to the computing device 110. Additionally, or alternatively, the user interface 150 may include any form of audio and/or visual outputs for receipt by a user of the computing device 110. The audio and/or visual outputs of the user interface 150 may include, for example, a light emitting diode (LED), a meter, a display, such as a liquid crystal display (LCD), or any other mechanism providing indication to a user of the condition and/or operation of the computing device 110.

The processor 156 may be used to run operating system applications, firmware applications, media playback applications, media editing applications, or any other application. In some embodiments, the processor 156 can drive a display and process inputs received from one or more input devices. The processor 156 may include one or more microprocessors, digital signal processors, field programmable gate arrays (FPGA), or any other mechanism or device capable of executing logic and/or processing input and output signals.

The memory 154 may be a volatile and/or a non-volatile memory device that is configured to store instructions executable by the processor 156. The memory 154 may include a medium that preserves data for retrieval, such as instructions retrieved for execution. The memory 154 may include a hard disk drive, a compact disc drive, a digital versatile disc drive, a Random Access Memory (RAM), a Read Only Memory (ROM), a Programmable Read-Only Memory (PROM), an Electrically Erasable Programmable Read-Only Memory (EEPROM), a flash memory, or any other digital storage device.

The computing device 110 may communicate with one or more input and/or output devices via the I/O interface 152. The input/output devices may include, for example, a keyboard (e.g., a hard keyboard or a soft keyboard), a mouse (e.g., a trackball, a rollerball, a touchpad, or other pointing device), a stylus or other pen-type input device (e.g., for a tablet PC type computing device), a disk drive, a USB port, a network connection, a joystick type controller, a telephone connection, an Ethernet connection, a voice recognition capability, or any other type of input/output devices. The input/output devices also may include, for example, a fax machine, a printer, a copier, an image and/or video display device (e.g., a television, a monitor, or a projector), an audio output device, or any other type of input/output devices.

The camera 115 may include any type of image capture device for capturing a moving image. For example, the camera may include a color and depth camera, a webcam, a charge coupled device (CCD) camera, a complementary metal oxide semiconductor (CMOS) camera, a 3D camera, or any other type of image capture device. The moving image may be captured and/or stored as image data. The image data may include a video. Alternatively, or additionally, the image data may include a series of still images that collectively define the moving image. The camera 115 may have a communication interface to communicate with the computing device 110 to exchange data, including image data. The camera 115 may transfer the image data and/or status information to the computing device 110. Additionally, or alternatively, the camera 115 may receive data from the computing device. For example, the camera may receive stored image data, instructions to perform a variety of tasks, or processing updates from the computing device 110. In one example, the camera 115 may be provided that is separate from the computing device 110. In another example, the camera 115 may be integral with the computing device 110 (e.g., an embedded webcam).

In another example, the camera 115 may include a communication interface to communicate with the retailer server 130 via the communication network 125 to exchange data, including image data. For example, the camera 115 may transfer image data and/or status information to the retailer server 130. Additionally, or alternatively, the camera 115 may receive data from the retailer server 130. For example, the camera 115 may receive stored image data, instructions to perform a variety of tasks, or processing updates from the retailer server 130.

In one example, a display device 150 may be provided for displaying an image captured by the camera 115. The display device 150 may be integral with or separate from the computing device 110. The display device 150 may be in communication with or may receive an input or signal from the camera 115. The display device 150 may be any suitable device operable to visually present information in an electronic form. For example, the display device 150 may present dynamic and/or static images such as video, text, photos, and graphical elements. The display device 150 may be a cathode ray tube (CRT) screen, a liquid crystal display (LCD), a plasma display panel (PDP), a field emission display (FED), an analog or digital projection, or any other type of display. In one example, the display device 150 may be configured as a shopper display through which a user (e.g., a consumer) may interact with the imaging system 100.

In one example, the display device 150 may display a graphical user interface (GUI) that enables the user of the interface to interact with at least a portion of the imaging system 100 for any suitable purpose. The display device 150 may provide the user with an efficient and user-friendly presentation of data provided by the imaging system 100. The display device 150 may include customizable frames or views having interactive fields, pull-down lists, and/or buttons operated by the user. The display device 150 may be a touch screen, and the GUI may be part of the display device. Depending on the type of touch screen, a user may interact with the touch screen with a touch of the user's finger or by touching the screen with a stylus.

In one example, the imaging system 100 may include the retailer server 130. The retailer server 130 may be located in a retail store location or may be located remote from the retail store location. The retailer server 130 may be connected to the communication network 125 in any desired manner including, for example, a wired or wireless connection using any network connection protocol. The retailer server 130 may be the control computer for a point of sale system for a retail store or a chain of retail stores.

The retailer server 130 can include any processor or processing circuitry operative to control the operations and performance of the imaging system 100. For example, processor can be used to run operating system applications, firmware applications, media playback applications, media editing applications, or any other application. In some embodiments, the processor can run a server application to drive a display and process inputs received from the computing device 110 and/or the user device 120.

The retailer server 130 may interact with the retailer database 145. The retailer database 145 can include, for example, one or more storage mediums including a hard-drive, solid state drive, flash memory, permanent memory such as read-only memory (ROM), any other suitable type of storage component, or any combination thereof. The retailer database 145 can store, for example, media data (e.g., music and video files and photos), application data (e.g., for implementing functions), firmware, authentication information (e.g., libraries of data associated with authorized users), user profile and lifestyle data (e.g., user preferences, age, and gender), transaction information data (e.g., information such as credit card information), wireless connection information data, contact information data (e.g., telephone numbers and email addresses), calendar information data, inventory data (e.g., data related to each product offered at a retail store or a chain of retail stores including an indication of availability for each product), any other suitable data, or any combination thereof.

In one example, the user device 120 can include any suitable type of electronic device. For example, the user device 120 may include a portable electronic device that may be held in the user's hand, such as a tablet PC, a smart phone, a personal data assistant (PDA), a cellular telephone, or the like. The user device 120 may include a user interface. The user interface on the user device 120 may be provided and controlled by one or more of the computing device 110 and/or the retailer server 130. Data for generating, maintaining, and receiving input through the user interface may be generated and provided via a computer readable media included as part of or associated with one or more of the computing device 110 and/or the retailer server 130. Examples of such computer readable media may include, but are not limited to computer-readable memories, both internal to a computer (e.g., hard drives) or separable from the computer (such as disks, solid state or flash memory devices, data available over a networked connection, etc.).

The user interface of the user device 120 may be used to complete a registration and/or login process. The user registration and/or login process can be tailored to the needs of the embodiment. In one embodiment of the user registration and/or login process, a user may login and/or register for a user account using a social networking account (e.g., Facebook, Twitter, etc.). For example, the retailer may allow a new user to register a new user account with the retailer using a social networking account. Typically, a social networking site may provide the retailer with a registration program, such as a plugin, which enables a user to easily sign up at the retailer website with the user's social networking account. Allowing a user to login and/or register using a valid social networking account may help to validate the user's identity. This also may enable information (e.g., information regarding how to obtain and/or change a password) to be sent to the user, which may provide an additional layer of security. Additionally, or alternatively, it may enable the user to easily share information with others using the social networking account via the social networking server 135.

In another example, the user may be prompted to create or provide a password, a username, and/or authentication information, which may not be associated with a social networking account. Alternatively, the user may be allowed to sign in as a guest without being required to register or provide any personal information. In other examples, user input may not be required at all to gain access.

In another example, the user device 120 can include a portable electronic device, such as a laptop computer. In yet another example, the user device 120 can include a substantially fixed electronic device, such as a desktop computer. In another example, the user device 120 may be omitted from the imaging system 100. In this example, the user may registered and/or login in to the imaging system 100 using the computing device 110.

In one example, the imaging system 100 may include the financial institution server 140. When processing an e-commerce transaction, the retailer server 130 may communicate with the financial institution server 140 to determine whether sufficient funds exist for the desired secure e-commerce transaction. Such communication may be between the retailer server 130 and the financial institution server 140 via a dedicated, or virtually dedicated, private and secure communication path via the communication network 125. The data exchanged between the retailer server 130 and the financial institution server 140 may be clear data and/or encrypted.

Figure 2:
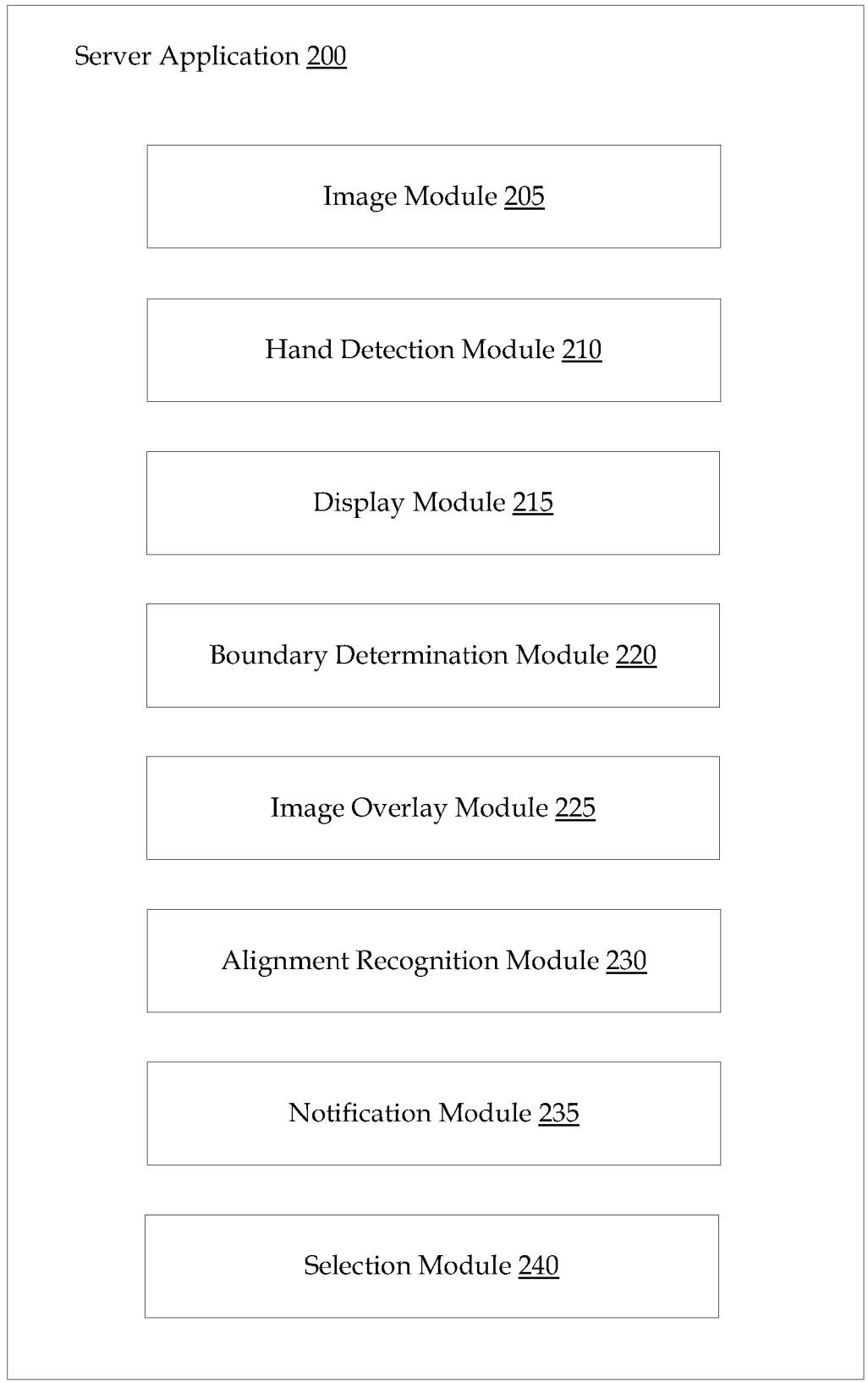
FIG. 2 illustrates one embodiment of a server application of the imaging system of FIG. 1.

Referring now to FIG. 2, a block diagram illustrating the components of a server application 200 is shown in an exemplary embodiment. The modules that are described herein are described for purposes of example as separate modules to illustrate functionalities that may be provided by the respective server application 200. In one embodiment, the server application 200 may include an image module 205, a hand detection module 210, a display module 215, a boundary determination module 220, an image overlay module 225, an alignment recognition module 230, a notification module 235, and a selection module 240. The server application 200 may be stored on or executable from the retailer server 130, the computing device 110, any other device, or any combination thereof. The server application 200 may interact with the retailer database 145.

Figure 3:
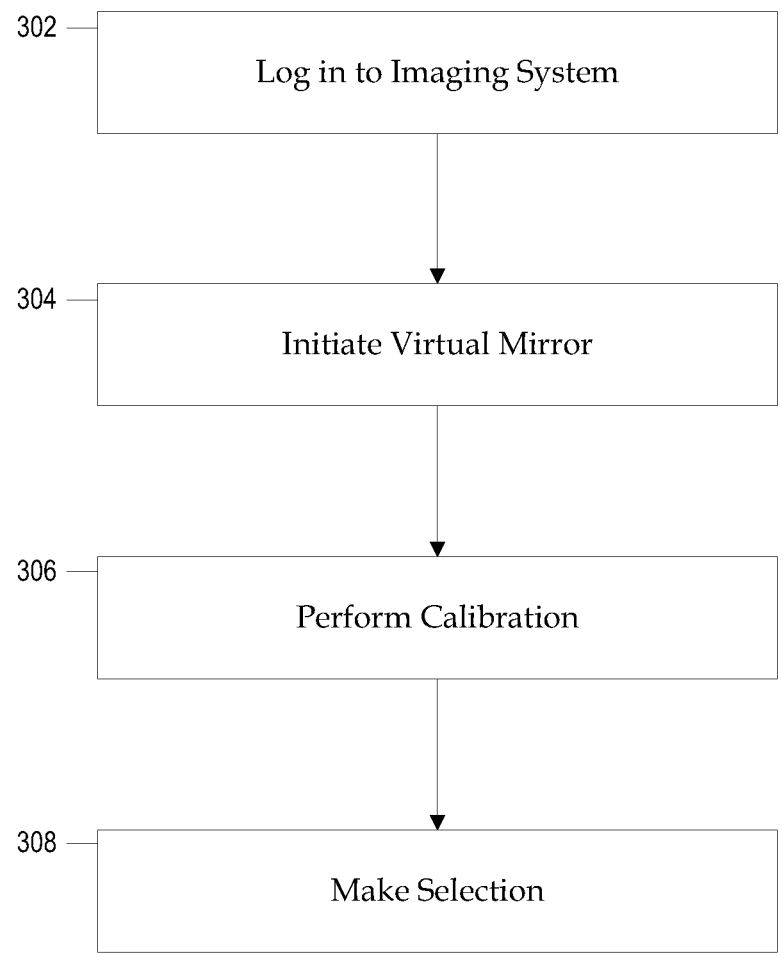
FIG. 3 is a flow chart illustrating one example of a method of operating the imaging system of FIG. 1.
Figure 4:
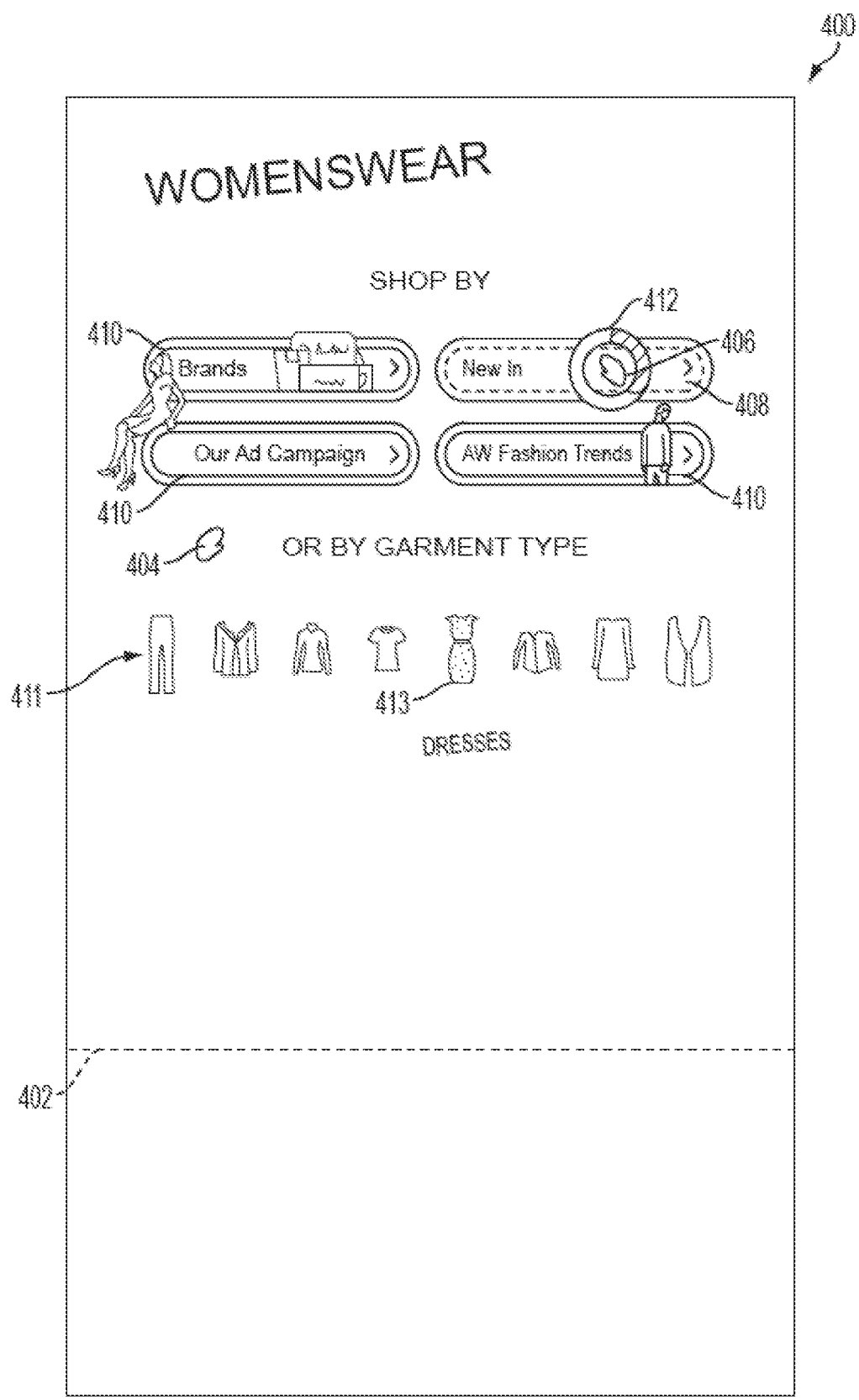
FIG. 4 is one example of a graphical user interface which may be displayed on a display device of the imaging system of FIG. 1.
Figure 5:
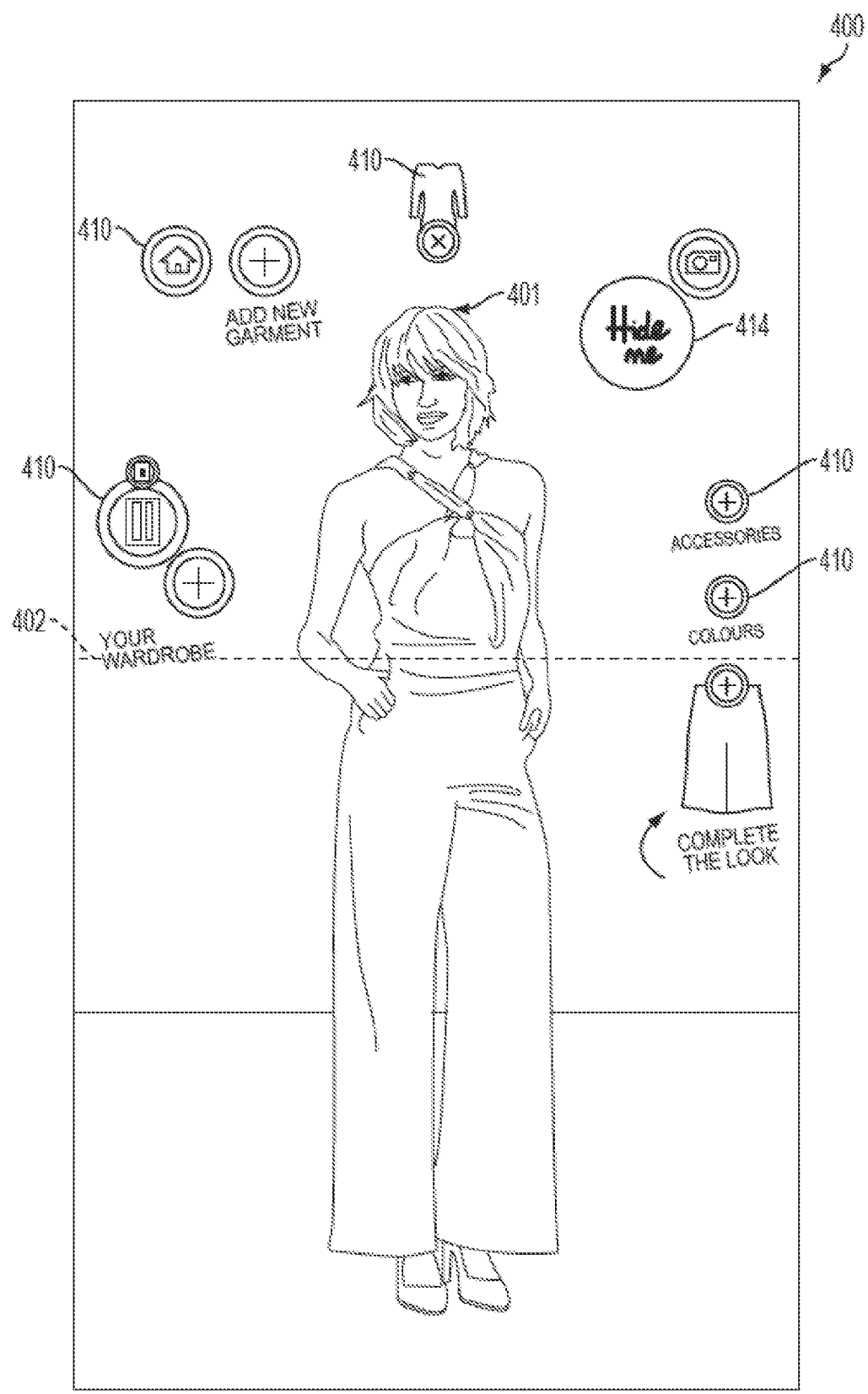
FIG. 5 is one example of a graphical user interface which may be displayed with a live reflection of a user on a display device of the imaging system of FIG. 1.

In one embodiment, the imaging system 100 may be configured to function as a virtual mirror, which may enable a user to virtually try on an article of clothing. FIG. 3 illustrates one embodiment of a method of operating the imaging system 100. The user may log in to the imaging system 100 at step 302. The user may log in using the user device 120, the computing device 110, or any other suitable device. The user may log in with a username and/or password associated with the imaging system 100 (e.g., a retailer account), a social networking account, or any other login information. A virtual mirror process may be initiated at step 304. The user may initiate the virtual mirror process by, for example, standing in front of the camera 115, waving the user's hands in front of the camera 115, or activating an appropriate input to the computing device 110. Upon initiation of the virtual mirror process, the computing device 110 may recognize the presence of the user in front of the camera 115. A GUI may be displayed on the display device 150. FIGS. 4-5 illustrate examples of a GUI 400, which may be displayed on the display device 150. FIG. 4 illustrates the GUI 400 displayed on the display device 150 without the image of the user. In other words, the live reflection of the user is hidden in the example illustrated in FIG. 4. FIG. 5 illustrates the GUI 400 displayed on the display device with the image of the user. In other words, the live reflection 401 of the user is visible in the example illustrated in FIG. 5. The user may interact with the GUI 400 as further described below.

Returning to FIG. 3, a calibration process may be performed at step 306. The calibration process may enable the imaging system 100 to locate or identify various points of the user's body so that the user may manipulate or control the imaging system as described below. The calibration process may include analyzing an image of the body of the user. The user may be requested to stand in a predefined position relative to the camera 115. For example, the user may be requested to stand with the user's arms raised, and the user's hands at predefined positions. During calibration, the image of the user may be displayed on the display device 150, as illustrated in the example of FIG. 5. The user may be guided into the predefined position by visual indicators displayed with the image of the user on the display device 150. In one example, the user may be requested to stand such that each of the user's hands in the image of the user is positioned within an identified portion of the display device (e.g., a circle displayed on the display device). This may enable the imaging system 100 to locate or identify each of the user's hands.

At step 308, a selection may be made. For example, the user may select a selectable object displayed on the display device 150 as part of the GUI 400 to navigate to one or more menus, to select one of a variety of different menu options, to select an item from a selectable list of items, or to select an article of clothing that the user wishes to try on using the virtual mirror.

Figure 6:
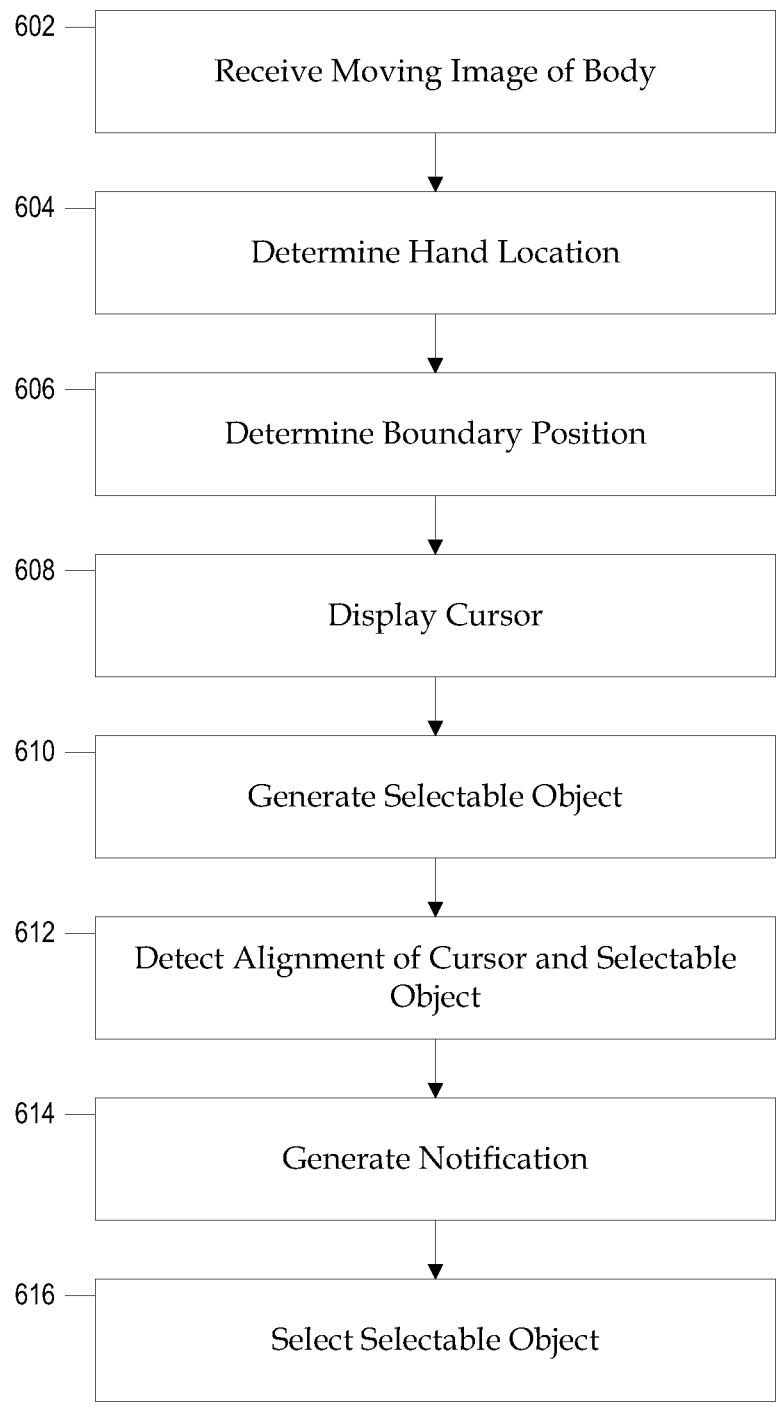
FIG. 6 is a flow chart illustrating one example of a method of making a selection on a display device.

FIG. 6 illustrates a series of steps which may be performed for the selection to be made. A moving image of a body of the user may be received at step 602. The moving image of the body may be captured by the camera 115 as described above. The moving image may be transmitted by the camera 115 for receipt by the image module 205 and displayed on the display device 150.

One or more hand locations may be determined at step 604. The hand location may be determined by the hand detection module 210. The hand location may be the location of a hand of the user relative to the camera 115. In other words, the hand location may be the location of the hand of a person standing in front of the virtual mirror display (i.e., in front of the camera 115). The hand location may include the location of a left hand of the user, the location of a right hand of the user, or both the location of the left hand and the location of the right hand.

A position of a boundary 402 may be determined at step 606. The position of the boundary 402 may be determined by the boundary determination module 220. The boundary 402 may be configured as a series of points positioned on the display device 150 to form a line, a curve, a rectangle, an ellipse, or any other pattern or shape extending in any direction along the display device. The boundary 402 may be visible on the display device 150 (e.g., the display module 215 may be configured to display the boundary on the display device). Alternatively, the boundary 402 may be invisible on the display device 150 (i.e., the boundary may be imperceptible to the user on the display device). The boundary 402 may include a boundary point. The boundary point may correspond to a reference point in the moving image of the body of the user positioned between a chest of the body and a knee of the body. Movement of the body in the moving image may cause a corresponding movement of the boundary on the display device 150. In other words, the position of the boundary on the display device 150 may dynamically change in response to movement of the body in the moving image. In one example, the boundary 402 may be configured as a curve extending at least partially horizontally along the display device 150 as shown in FIGS. 4-5. The position of the boundary 402 on the display device 150 may correspond approximately to the position of the abdomen of the user in the moving image as illustrated in FIG. 5.

Returning to FIG. 6, at least one cursor may be displayed at step 608. The cursor may be displayed on the display device 150 by the display module 215. The cursor may function as a mouse pointer which may be used to interact with the GUI 400 displayed on the display device 150. The position of the cursor on the display device 150 may correspond to the location of a hand of the user. In one example, a left cursor 404 and a right cursor 406 may be displayed on the display device 150 as shown in FIG. 4. The position of the left cursor 404 on the display device 150 may correspond to the location of the left hand of the user in the moving image, and the position of the right cursor 406 on the display device may correspond to the location of the right hand of the user in the moving image. The positions of the cursors on the display device 150 may change in response to movement of the corresponding hands of the user in the moving image. To that end, the hand detection module 210 may be configured to track movement of the locations of the left and/or right hands of the user in the moving image, and the display module 215 may be configured to adjust the positions of the left and/or right cursors 404, 406 in response to such movement.

The cursor may be displayed on the display device 150 in response to the location of the hand of the user relative to the boundary. For example, the left cursor 404 may be displayed on the display device 150 in response to the position of the left cursor on the display device, which may correspond to the location of the left hand in the moving image, being above the boundary 402 as shown in FIG. 4. Conversely, the left cursor 404 may be hidden (i.e., may be invisible on the display device 150) in response to the position of the left cursor being below the boundary 402 as shown in FIG. 5. Likewise, the right cursor 406 may be displayed on the display device 150 in response to the position of the right cursor on the display device, which may correspond to the location of the right hand in the moving image, being above the boundary 402. Conversely, the right cursor 406 may be hidden (i.e., may be invisible on the display device 150) in response to the position of the right cursor being below the boundary 402. In other examples, the cursor may be displayed or hidden in response to the position of the cursor being in any other desired position (e.g., below, to the right, to the left, inside, or outside) with respect to the boundary 402. Selectively displaying and/or hiding a cursor may aid in avoiding unintentional selections which may otherwise occur when the user is in a relaxed position (e.g., with the user's hands placed at the user's sides). Alternatively, or additionally, such selective display may enable a clear view of the GUI 400 or a live reflection of the user on the display device 150 unobstructed by the cursors.

Returning to FIG. 6, a selectable object may be generated at step 610. The selectable object may be generated by the image overlay module 225. The display module 215 may be configured to display the selectable object on the display device 150. In one example, the selectable object 408 may be displayed on the display device 150 as part of the GUI 400 as shown in FIGS. 4-5. The GUI 400 may include any number of selectable objects. For example, the GUI 400 may include the selectable object 408, the selectable objects 410, and the list of selectable items 411. The selectable objects may be displayed at any positions on the display device 150. The selectable object may include a button, a slider, a list of selectable items (e.g., a drop down list of selectable items or a rotating list, such as a carousel type list, of selectable items), or any other object which may be selected and/or manipulated by the user. The user may select one or more of the selectable objects, as further described below, to generate a desired response from the imaging system 100. For example, the user may select a selectable object to make a desired menu selection or to select a desired article of clothing.

As described above, in one embodiment, the imaging system 100 may be configured to function as a virtual mirror which may enable a user to virtually try on an article of clothing. To that end, the GUI 400 may include a selectable object configured as a show me selectable object and/or a hide me selectable object. For example, the GUI 400 may include show me and/or hide me buttons 414 as shown in FIG. 5. In other examples, the GUI 400 may include a dropdown list with show me and/or hide me options, or any other type of selectable object that may enable the user to select show me and/or hide me. Upon selection of the show me selectable object, the moving image of the user may be displayed on the display device 150. In other words, a live image representing a reflection (i.e., a live reflection) of the user may be displayed on the display device 150 such that the display device 150 may function as a virtual mirror display. The cursors, one or more selectable objects, the boundary, or any component of the GUI 400 may be superimposed, overlayed, or otherwise displayed on the display device 150 with the moving image. The components of the GUI may be displayed on top of or beneath (e.g., behind) the moving image on the display device 150.

Upon selection of an article of clothing to virtually try on, a stored image of the article of clothing may be superimposed over the moving image such that the user appears to be wearing the selected article of clothing on the display device 150. The displayed article of clothing may move on the display device 150 to correspond with movement of the user in the moving image. Upon selection of the hide me selectable object 414, the moving image of the user may be hidden (i.e., may be invisible) on the display device 150. In other words, the live reflection of the user may be hidden. In other examples, upon selection of the hide me selectable object 414, the moving image of the user may be partially hidden. For example, other components of the GUI 400 may be displayed on top of the moving image, and those components of the GUI may be at least partially transparent such that the moving image is at least partially visible behind those components of the GUI. This may enable the user to see the moving image (i.e., the live reflection) through the other components of the GUI 400, which may aid the user in moving a cursor to a desired position on the display device 150. The GUI 400 may be displayed on the display device 150 with or without the moving image.

In one example, the imaging system 100 may be configured to assist the user in selecting articles of clothing that may be worn together as an outfit. In other words, the imaging system 100 may be configured to function as an outfit builder. To that end, one or more recommended articles of clothing may be displayed on the display device 150 in response to an article of clothing selected by the user. The imaging system 100 may be configured to determine the recommended articles of clothing based on clothing recommendation data stored, for example, in the retailer database 145. In one example, the recommended articles of clothing may be alternatives to the article of clothing selected by the user. For example, the article of clothing selected by the user may be a blouse, and a recommended article of clothing may be the same blouse in a different color or a similar blouse in the same or a different color. In another example, the recommended articles of clothing may be complimentary to the article of clothing selected by the user. For example, the article of clothing selected by the user may be a blouse, and a recommended article of clothing may be a jacket, a pair of pants, or a skirt that may be worn with the blouse. The user may select a recommended article of clothing to virtually try on the recommended article of clothing with the previously selected article of clothing. In other words, the user may virtually try on multiple articles of clothing simultaneously as an outfit. Additionally, or alternatively, the user may remove an article of clothing that the user is virtually trying on by selecting a remove selectable object on the display device 150. In this manner, the user may add and/or remove articles of clothing from the outfit.

In one example, the imaging system 100 may be configured to store one or more outfits. The outfits may be stored, for example, as wardrobe data in the memory 154, the retailer database 145, or the social networking server 135. Each outfit may include one or more articles of clothing as described above. An outfit may be stored in response to selection of an add to wardrobe selectable object on the display device 150. In other words, the user may add an outfit to the wardrobe by selecting the add to wardrobe selectable object on the display device 150. An outfit may be removed from the wardrobe in response to selection of a remove from wardrobe selectable object on the display device 150. In this manner, the imaging system 100 may enable a user to add and/or remove one or more outfits from a virtual wardrobe. The imaging system 100 may enable an article of clothing and/or an outfit (e.g., an outfit stored in the wardrobe) to be purchased in response to selection of a purchase selectable object on the display device 150. The imaging system 100 may enable an article of clothing and/or an outfit (e.g., an outfit stored in the wardrobe) to be shared (e.g., posted to Facebook, Twitter, or any social networking system or sent via email, picture message, or any form of electronic communication) in response to selection of a share selectable object on the display device 150.

Returning to FIG. 6, alignment of the cursor with the selectable object may be detected at step 612. Such alignment may be detected by the alignment recognition module 230. Alignment may be detected in response to the position of the cursor on the display device 150 being substantially aligned with the position of the selectable object on the display device. The cursor may be substantially aligned with the selectable object when the cursor touches the selectable object on the display device 150. In other words, alignment may be detected when the cursor hovers over any part of, or at least part of, the selectable object on the display device 150. For example, alignment may be detected in response to the position of the right cursor 406 on the display device 150 being substantially aligned with the selectable object 408 on the display device as shown in FIG. 4. In other examples, alignment may be detected in response to the position of any of the cursors described herein (e.g., the left cursor 404 or the right cursor 406) being substantially aligned with the position of any of the selectable objects described herein (e.g., the selectable object 408, the selectable objects 410, or the selectable list of items 411).

An attribute of the selectable object may be changed in response to detection of alignment as described above. For example, a color of the selectable object may be changed in response to detection of alignment. As shown in FIG. 4, the selectable object 408 substantially aligned with the right cursor 406 may be highlighted in response to such alignment. In another example, the selectable object may be configured as a list of selectable items 411 (e.g., a carousel type list of selectable items). The items may rotate in response to alignment of the cursor with one of the items in the list of selectable items 411. For example, one of the items 413 may be highlighted in response to substantial alignment with the cursor. In other words, the item 413 may be highlighted by hovering the cursor over at least a part of the item. The highlighted item may move to the center of the list of selectable items 411. In other words, the items may rotate as if on a carousel such that the highlighted item 413 is positioned in the center of the list of selectable items 411. In another example, the highlighted item 413 may remain stationary on the display device 150 in response to substantial alignment with the cursor. In other words, the highlighted item 413 may be selected from the list of selectable items 411 even though the highlighted item may not be positioned in the center of the list of selectable items.

Returning to FIG. 6, a notification may be generated at step 614 in response to detection of alignment as described above. The notification may be generated by the notification module 235. The notification may include a visual notification, an audible notification, a tactile notification, or any other type of notification that may be perceptible by the user. The notification may provide an indication to the user that a selection is pending. For example, the notification may provide an indication to the user that the selectable object with which the cursor is substantially aligned will be selected after passage of a predetermined amount of time, as further described below.

In one example, the notification may include a predetermined shape, which may be generated for display on the display device 150 near the cursor aligned with the selectable object. The predetermined shape may be displayed on the display device 150 (e.g., by the display module 215), and may at least partially surround the cursor. For example, the notification may include a circle 412 as shown in FIG. 4. The circle 412 may be displayed on the display device 150 surrounding the right cursor 406 substantially aligned with the selectable object 408. In other examples, the predetermined shape may be a triangle, a square, an ellipse, or any other polygonal or non-polygonal shape. In one example, the predetermined shape may be displayed on the display device 150 in response to detection of alignment as described above. In another example, the predetermined shape may be displayed on the display device 150 (e.g., as part of or along with the cursor), and at least one attribute of the predetermined shape may be adjusted, as described below, in response to detection of alignment.

Generating the notification may include changing at least one attribute of the predetermined shape. For example, one attribute of the predetermined shape may be changed in response to a length of time that the cursor is aligned with the selectable object. In other words, at least one attribute of the predetermined shape may change as a function of the amount of time that the cursor hovers over at least a part of the selectable object. The attribute may include, for example, a color, a brightness, a transparency, a shape, a size, or any other attribute of the predetermined shape. In one example, the circle 406 may include an inner circle and an outer circle cooperatively defining a ring surrounding the right cursor 406. The circle 412 may include an annular space between the inner circle and the outer circle. The annular space may initially be filled with a first color. In one example, the first color may be white. In other examples, the annular space may be transparent. In other words, the portion of the GUI 400 over which the circle 412 is displayed may be visible in the annular space.

The annular space may be filled with a second color in response to the length of time that the right cursor 406 is aligned with the selectable object 408. In one example, the second color may be purple. The annular space may change from the first color to the second color incrementally in response to the length of time that the right cursor 406 remains substantially aligned with the selectable object 408. For example, as the length of time that the right cursor 406 is substantially aligned with the selectable object 408 increases, the annular space may be filled with the second color incrementally around the perimeter (e.g., the circumference) of the circle 412. The portion of the annular space that is filled with the second color may be representative of the portion of the predetermined time that has elapsed before selection of the selectable object 408 is to occur. For example, if 30% of the predetermined time has elapsed, 30% of the circumference of the circle 412 may be filled with the second color, and the remaining 70% of the circle may be filled with the first color.

The changed attribute of the predetermined shape may be reset in response to misalignment of the cursor with the selectable object. Resetting the changed attribute may include returning the changed attribute to an initial or pre-alignment state (e.g., the state of the attribute prior to detection of alignment). For example, the right cursor 406 may be substantially aligned with the selectable object 408 for less than the predetermined time and then misaligned with the selectable object 408. In this example, the annular space of the circle 412 may be filled with the first color in response to such misalignment of the right cursor 406 with the selectable object 408. In other words, the color of the circle may be reset in response to such misalignment. Additionally, or alternatively, the length of time that the cursor 406 is substantially aligned with the selectable object 408 may be reset (e.g., set to 0 seconds) in response to such misalignment. Upon realignment of the cursor 406 with the selectable object 408 following such reset, the length of time that the cursor 406 is substantially aligned with the selectable object 408 may begin to run as described above.

Returning to FIG. 6, a selection may be made at step 616. The selection may be made by the selection module 240. The selection may be made in response to passage of the predetermined time. In other words, the selection may be made in response to the cursor being substantially aligned with the selectable object, or remaining steady over the selectable object, for the predetermined length of time. For example, the selectable object 406 may be selected in response to the right cursor 412 being aligned with, or remaining steady over, the selectable object 406 for the predetermined time. In one example, the predetermined time may be 2 seconds. In other examples, the predetermined time may be any length of time. The imaging system 100 may take any appropriate action in response to selection of the selectable object 406. For example, the GUI 400 may be adjusted in response to selection of the selectable object 406 to display different menu options, clothing items, or other information.

Selection may be configured as a mouse click. In other words, selection of the selectable object 406 may have the effect of clicking a mouse button with the cursor aligned with the selectable object 408. In one example, selection of the selectable object 408 as described above may have the effect of a single click of a mouse button, such as a left mouse button. In other examples, selection of the selectable object 408 may have the effect of a double click of a mouse button, such as a left mouse button, a single click or a double click of a right mouse button, or a single click or a double click of any other mouse button, such as a center mouse button. For example, selection of the selectable object 408 may have the effect of one of a single click and a double click of one of a left mouse button, a right mouse button, and a center mouse button in response to both of the left cursor 404 and the right cursor 406 being substantially aligned with the selectable object 408 for the predetermined time. In another example, selection of the selectable object 408 may have the effect of one of a single click and a double click of one of a left mouse button, a right mouse button, and a center mouse button in response to each of the left cursor 404, the right cursor 406, and the selectable object 408 being substantially aligned with one another for the predetermined time. In other examples, selection of the selectable object 406 may have the effect of one of a single click and a double click of one of a left mouse button, a right mouse button, and a center mouse button in response to any combination of the positions of the left cursor 404 and/or the right cursor 406 relative to the selectable object 408 and/or one another. In still other examples, selection of the selectable object 408 may have the effect of one of a single click and a double click of one of a left mouse button, a right mouse button, and a center mouse button in response to one or more gestures or sequences of movements of the left cursor and/or the right cursor.

Various embodiments described herein can be used alone or in combination with one another. The foregoing detailed description has described only a few of the many possible implementations of the present invention. For this reason, this detailed description is intended by way of illustration, and not by way of limitation.

The invention claim is:

1. A method of detecting a mouse click on a virtual mirror display, the method comprising:
   providing, by a display device operatively connected to a processor, a live reflection on the virtual mirror display;

displaying a selectable object on the virtual mirror display;
displaying a first cursor position by displaying a first circle on the virtual mirror display, the first cursor position corresponding to a right hand position of the live reflection;
displaying a second cursor position by displaying a second circle on the virtual mirror display, the second cursor position corresponding to a left hand position of the live reflection;
detecting, by the processor, the mouse click in response to the first or second circle hovering over at least a part of the selectable object, wherein the first or second circle remains steady over the selectable object on the virtual mirror display for a predetermined period of time;
hiding the first cursor from the virtual mirror display when the right hand position is below a determined boundary and the left hand position is above the boundary, while maintaining the live reflection and second cursor on the virtual mirror display; and
hiding the second cursor from the virtual mirror display when the left hand position is below the determined boundary and the right hand position is above the boundary, while maintaining the live reflection and first cursor on the virtual mirror display.

2. The method of claim 1, wherein the predetermined period of time is displayed on the virtual mirror by incrementally filling the first or second circle with a color.

3. The method of claim 1, further comprising displaying different selectable menu options on the display screen.

4. The method of claim 1, further comprising selecting an item from a selectable list of items that is displayed on the virtual mirror display, wherein the selected item is not in the center of the selectable list of items.

5. The method of claim 1, further comprising displaying a menu option of hide me or show me on the virtual mirror display depending on whether the virtual mirror display is to display or hide the live reflection.

6. The method of claim 1, wherein the method further comprises distinguishing between a single click, a double click, a right click, a left click, or a center button click based on the left and right hand positions.

7. A system comprising:
a memory comprising a plurality of modules, and a processor configured to execute the plurality of modules;
an image module configured to receive a moving image of a body from an image capture device;
a hand detection module executable to determine a location of a left hand of the body in the received image, to determine a location of a right hand of the body in the received image, and to track movement of the locations of the left and right hands in the received image;
a display module executable to display a left cursor and a right cursor on a display device, a position of the left cursor on the display device corresponding to the location of the left hand of the body, a position of the right cursor on the display device corresponding to the location of the right hand of the body; and
a boundary determination module executable to determine a position of a boundary on the display device, the boundary extending at least partially horizontally and comprising a boundary point corresponding to a reference point in the received image positioned between a chest of the body and a knee of the body;
wherein the display module is executable to:
display the left cursor on the display device in response to the location of the left hand relative to the boundary and to display the right cursor on the display device in response to the location of the right hand relative to the boundary;
hide the right cursor from the display device when the location of the right hand is below the boundary and the location of the left hand is above the boundary, while maintaining the moving image of the body and left cursor on the display device; and
hide the left cursor from the display device when the location of the left hand is below the boundary and the location of the right hand is above the boundary, while maintaining the moving image of the body and right cursor on the display device.

8. The system of claim 7, further comprising an image overlay module executable to generate at least one selectable object, wherein the display module is further executable to display the selectable object on the display device, and the system further comprises an alignment recognition module executable to recognize alignment of at least one of the position of the left cursor and the position of the right cursor with the selectable object, and a notification module executable to generate a notification in response to alignment of the at least one of the position of the left cursor and the position of the right cursor with the selectable object.

9. system of claim 8, wherein the notification comprises a visual notification or an audible notification.

10. The system of claim 8, wherein the alignment recognition module is further executable to recognize misalignment of the at least one of the position of the left cursor and the position of the right cursor with the selectable object, and the notification module is further executable to reset the notification in response to misalignment of the at least one of the position of the left cursor and the position of the right cursor with the selectable object.

11. The system of claim 8, wherein the notification comprises a predetermined shape generated to surround the at least one of the left cursor and the right cursor aligned with the selectable object, the display module is further executable to display the predetermined shape on the display device, and to change a color of the predetermined shape in response to a length of time that the at least one of the left cursor and the right cursor is aligned with the selectable object.

12. The system of claim 11, wherein the display module is executable to change the color of the predetermined shape incrementally around a perimeter of the predetermined shape in response to the length of time that the at least one of the left cursor and the right cursor is aligned with the selectable object.

13. The system of claim 8, further comprising a selection module executable to select the selectable object in response to the at least one of the left cursor and the right cursor being aligned with the selectable object for a predetermined length of time.

14. The system of claim 7, wherein the display module is further executable to display the received image on the display device.

15. The system of claim 7, wherein the position of the boundary on the display device dynamically changes in response to movement of the body in the received image.

16. A non-transitory computer readable medium encoded with computer executable instructions, the computer executable instructions executable with a processor, the non-transitory computer readable medium comprising:
instructions executable to receive a moving image of a body;

instructions executable to determine locations of left and right hands of the body in the received image and to track movement of the locations of the left and right hands in the received image;

instructions executable to generate a selectable object;

instructions executable to display the selectable object and left and right cursors on a virtual mirror display, a position of the left cursor corresponding to the location of the left hand, and a position of the right cursor corresponding to the location of the right hand;

instructions executable to recognize alignment of at least one of the position of the left cursor and the position of the right cursor with the selectable object, and to display a circle surrounding the at least one of the left cursor and the right cursor in response to alignment with the selectable object;

instructions executable to detect a mouse click in response to the at least one of the left cursor and the right cursor remaining in alignment with the selectable object for a predetermined period of time;

instructions executable to determine a position of a boundary area on the virtual mirror display, the boundary area extending at least partially horizontally and comprising a boundary point corresponding to a reference point in the received image positioned between a chest of the body and a knee of the body;

instructions executable to display the left cursor on the virtual mirror display in response to the location of the left hand relative to the boundary area and to display the right cursor on the virtual mirror display in response to the location of the right hand relative to the boundary area;

instructions executable to omit the right cursor from the virtual mirror display in response to the location of the right hand being outside the boundary area and the location of the left hand being inside the boundary area, while the moving image of the body and the left cursor are maintained in the virtual mirror display; and instructions executable to hide the left cursor from the virtual mirror display in response to the location of the left hand being outside the boundary area and the location of the right hand being inside the boundary area, while the moving image of the body and right cursor are maintained in the virtual mirror display.

17. The non-transitory computer readable medium of claim 16, further comprising instructions executable to fill the circle with a color in response to passage of the predetermined period of time and the cursor remaining in alignment with the selectable object.

18. The method of claim 5, further comprising, when the menu option of hide me is selected, displaying on the virtual mirror display the menu option of hide me or show me and a selectable list of items as a partially transparent overlay on the live reflection so that the live reflection is at least partially visible behind the partially transparent overlay.

19. The system of claim 7, wherein the display module is further executable, in response to a selection of a hide me menu option, to display, on the display device, a menu option of hide me or show me and a plurality of selectable objects as a partially transparent overlay on the moving image of the body so that the moving image is at least partially visible behind the partially transparent overlay.

20. The non-transitory computer readable medium of claim 16, further comprising instructions executable in response to a selection of a hide me menu option to display, on the virtual mirror display, a menu option of hide me or show me and a plurality of selectable objects as a partially transparent overlay on the moving image of the body so that the moving image is at least partially visible behind the partially transparent overlay.

* * * * *